(12) United States Patent
Keil et al.

(10) Patent No.: US 10,540,883 B1
(45) Date of Patent: Jan. 21, 2020

(54) METHODS AND SYSTEMS FOR AUDIO-BASED DANGER DETECTION AND ALERT

(71) Applicant: Life360, Inc., San Francisco, CA (US)

(72) Inventors: Dylan Keil, Menlo Park, CA (US); Alexander Haro, Las Vegas, NV (US)

(73) Assignee: Life360, Inc., San Francisco, CA (US)

( * ) Notice: Subject to any disclaimer, the term of this patent is extended or adjusted under 35 U.S.C. 154(b) by 0 days.

(21) Appl. No.: 16/012,614

(22) Filed: Jun. 19, 2018

(51) Int. Cl.
*G08B 25/00* (2006.01)
*G10L 25/51* (2013.01)

(52) U.S. Cl.
CPC ............ *G08B 25/006* (2013.01); *G10L 25/51* (2013.01)

(58) Field of Classification Search
CPC .... G08B 21/04; G08B 21/0469; G08B 25/00; G08B 25/006; G08B 25/012; G08B 25/016; G08B 25/10; G10L 25/51; H04W 4/90
See application file for complete search history.

(56) References Cited

U.S. PATENT DOCUMENTS

| | | | |
|---|---|---|---|
| 8,768,294 B2 | 7/2014 | Reitnour et al. | |
| 8,929,853 B2 | 1/2015 | Butler | |
| 9,380,439 B2 | 6/2016 | Rothschild | |
| 9,426,638 B1 | 8/2016 | Johnson | |
| 9,457,754 B1* | 10/2016 | Christensen | B60R 21/0136 |
| 9,672,719 B1* | 6/2017 | Hollenstain | G08B 21/18 |
| 9,715,805 B1 | 7/2017 | Scully et al. | |
| 9,781,063 B2 | 10/2017 | Crawford | |
| 9,838,861 B2 | 12/2017 | Singh et al. | |
| 9,906,406 B2* | 2/2018 | Fu | H04L 41/069 |
| 10,043,375 B2* | 8/2018 | Au Yeung | H04M 1/72569 |
| 2007/0288242 A1* | 12/2007 | Spengler | G10L 15/20 704/275 |
| 2008/0094230 A1* | 4/2008 | Mock | G08B 1/08 340/573.4 |
| 2013/0040600 A1 | 2/2013 | Reitnour et al. | |
| 2014/0066000 A1 | 3/2014 | Butler | |
| 2014/0066002 A1 | 3/2014 | Rothschild | |
| 2014/0074504 A1 | 3/2014 | Nelson et al. | |
| 2014/0253326 A1* | 9/2014 | Cho | G08B 25/10 340/539.13 |
| 2014/0329491 A1 | 11/2014 | Scott | |
| 2016/0099895 A1 | 4/2016 | Crawford | |
| 2017/0188216 A1 | 6/2017 | Koskas et al. | |
| 2017/0251349 A1 | 8/2017 | Singh et al. | |
| 2017/0278307 A1 | 9/2017 | Uetabira | |

* cited by examiner

*Primary Examiner* — Jason R Kurr
(74) *Attorney, Agent, or Firm* — Womble Bond Dickinson (US) LLP (57) ABSTRACT

Methods and systems for emergency detection and alert are disclosed. In one embodiment, an ambient sound sample and contextual data are received over a network from a communication device. The ambient sound sample and the contextual data are analyzed by comparing the ambient sound sample and the contextual data with historical audio and context profiles. Whether a potential danger exists is determined based on the comparison. In response to determining that the potential danger exists, a user of the communication device is alerted of the potential danger and a response is requested from the user.

20 Claims, 7 Drawing Sheets

METHODS AND SYSTEMS FOR AUDIO-BASED DANGER DETECTION AND ALERT

Embodiments of the present disclosure relate generally to methods and systems for emergency monitoring. More particularly, embodiments of the disclosure relate to methods and systems for audio-based emergency detection and alert.

BACKGROUND

The use of mobile devices (e.g., smartphone) has become ubiquitous. Mobile devices today have many capabilities, such as voice assistant (e.g., Siri, OK Google, Bixby, and the like), global positioning system (GPS) based navigation, photograph and video capture, telephone call, text messaging, etc. In an emergency situation, a user can leverage such capabilities from a mobile device to communicate with an emergency hotline (e.g., 911) or an emergency contact (e.g., family member, friend, etc.).

Unfortunately, in certain situations, for example if the user is incapacitated, actively trying to escape from a dangerous situation, such as physical assault, or unaware of a potential hazard, such as being followed by another person in a deserted valley, the above-mentioned capabilities are rendered useless as the user cannot easily or readily access his or her mobile device.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment", "an embodiment", or "some embodiments" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, an ambient sound sample and contextual data are received over a network from a communication device. The ambient sound sample and the contextual data are analyzed by comparing the ambient sound sample and the contextual data with historical audio and context profiles. Whether a potential danger exists is determined based on the comparison. In response to determining that the potential danger exists, a user of the communication device is alerted of the potential danger and a response is requested from the user.

In one embodiment, whether the response was received from the user is determined. In response to determining that no response was received from the user within a predetermined time limit, or that the response was received from the user indicating a confirmation of the alert, one or more emergency contacts assigned by the user are notified of the potential danger. The analyzed ambient sound sample and the contextual data are stored as historical data.

In another embodiment, to analyze the ambient sound sample and the contextual data, a speech recognition technique on the ambient sound sample is performed to identify sounds produced in human speech. A sound recognition technique on the ambient sound sample is performed to identify sounds that are associated with distress events.

In yet another embodiment, to compare the ambient sound sample and the contextual data with the historical audio and context profiles, the ambient sound sample is compared with historical ambient sound samples to identify a sound category for the ambient sound sample, where the historical ambient sound samples include previous analyzed sound samples that have been identified and categorized into different sound categories, and the contextual data is compared with historical contextual data to identify a contextual environment surrounding the user, where the historical context data includes previous analyzed contextual data that have been identified and categorized into different contextual environments.

In still another embodiment, subsequent to notifying the emergency contact(s) assigned by the user of the potential danger, an emergency service is contacted to provide details about the potential danger.

Figure 1:
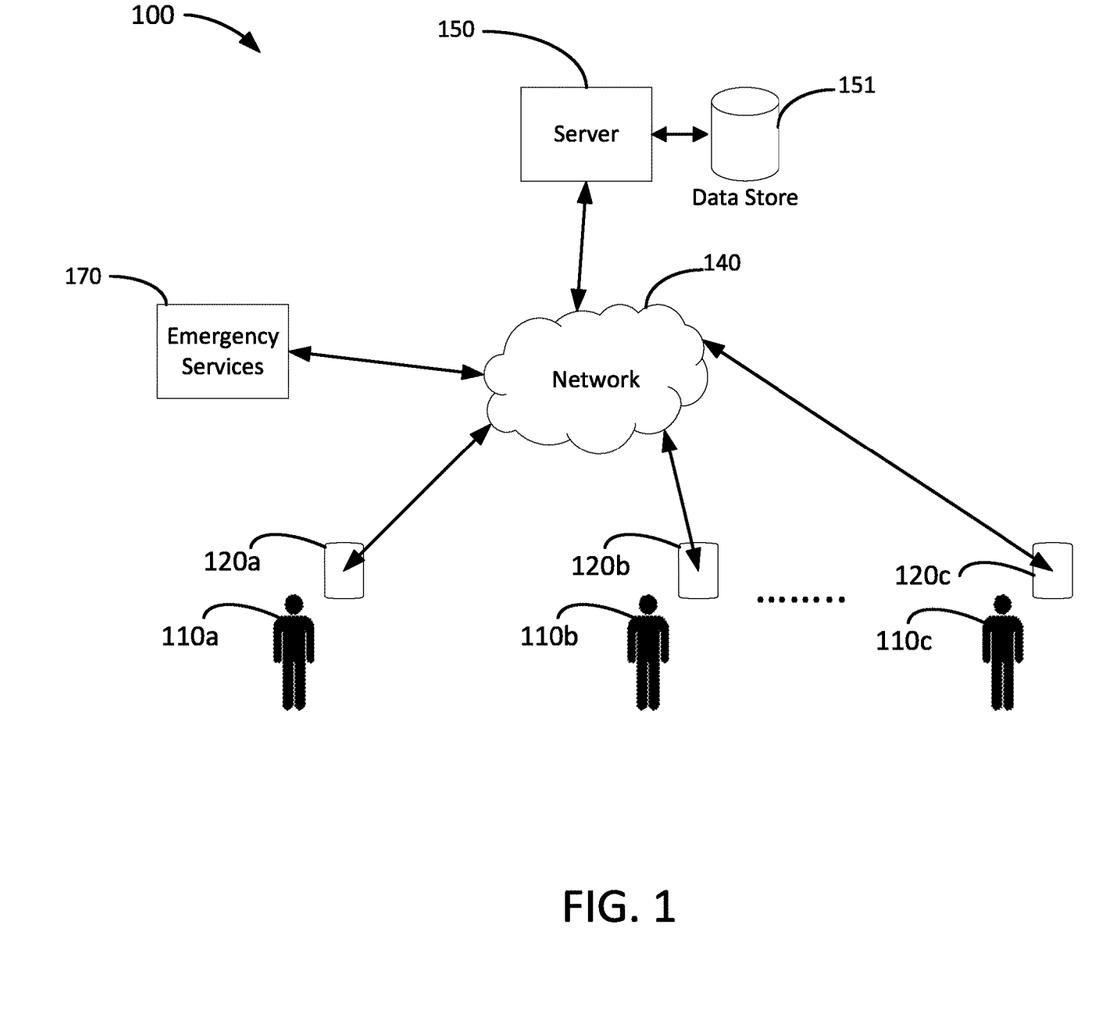
FIG. 1 is a block diagram illustrating a system for emergency detection and alert according to one embodiment.

FIG. 1 is a block diagram illustrating a system for emergency detection and alert according to one embodiment. Referring to FIG. 1, system 100 includes a server 150, emergency services 170, and a number of communication devices 120a-c that may be communicatively coupled to one another over network 140. In FIG. 1, users 110a-c are respectively equipped with communication devices 120a-c. In one embodiment, each of communication devices 120a-c may be a mobile device (e.g., smartphone, tablet), a laptop computer, a desktop computer, a wearable device (e.g., smartwatch), a personal data organizer, a vehicle (e.g., autonomous vehicle), or the like. In some embodiments, these types of electronic devices, as well as other electronic devices that provide voice communication capabilities, may be used in conjunction to perform the embodiments of the disclosure. It should be noted that while FIG. 1 shows three users respectively equipped with three communication devices, embodiments of the disclosure may include any number of users and communication devices as part of system 100.

Figure 3:
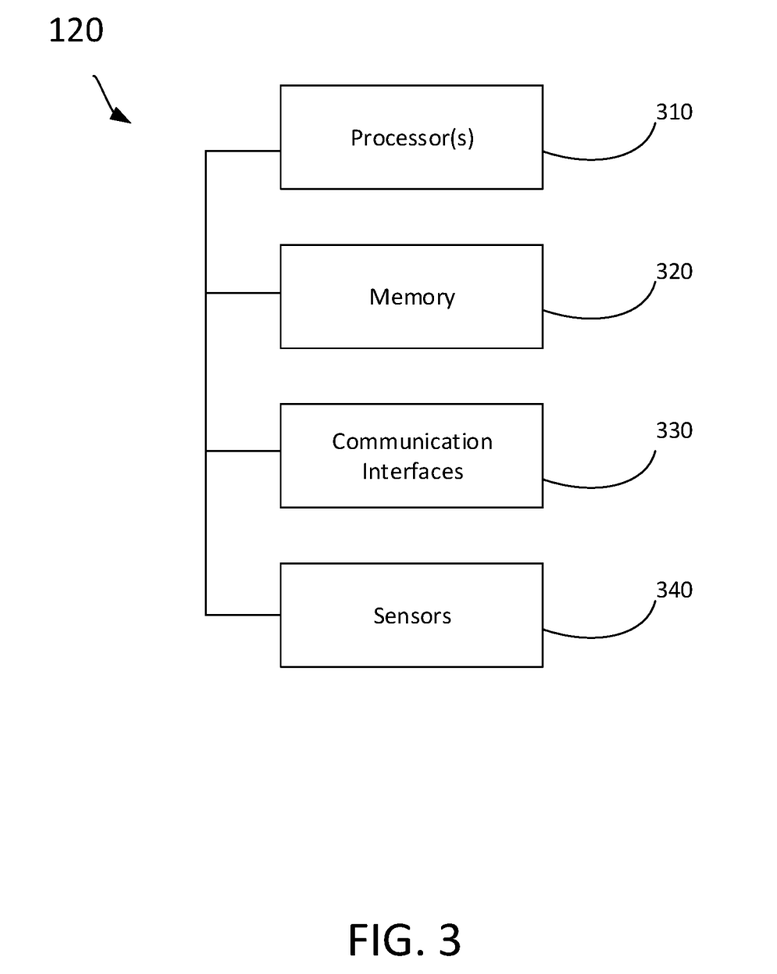
FIG. 3 is an exemplary block representation of a communication device according to one embodiment.

Referring now to FIG. 3, which shows an exemplary block representation of communication device 120 in system 100 of FIG. 1, communication device 120 (i.e., any of communication device 120*a-c*) may include one or more processors 310, memory 320, sensors 340 (e.g., GPS, gyroscope, accelerometer, compass, barometer, magnetometer, proximity sensor, light sensor, thermometer, touch screen, camera, microphone, etc.), and communication interfaces 330, such as 2G, 3G, 4G, 5G, long term evolution (LTE) modem, WiFi, Bluetooth, near-field communication (NFC), etc.

Processor(s) 310 may be a microprocessor, a microcontroller, a cell processor, or a central processing unit (CPU). The term "processor" may refer to a device having two or more processing units or elements, e.g., a CPU with multiple processing cores. Processor(s) 310 may be used to control the operations of the communication device 120. In one embodiment, the processor(s) 310 is also coupled to the memory (or storage) 320 that may include one or more different types of storage such as hard disk drive (HDD) storage, solid state drive (SSD) storage, nonvolatile memory, and volatile memory such as dynamic random access memory (DRAM).

The communication interfaces 330 may include a network communication interface that may include a wired network interface, such as an IEEE 802.3 Ethernet interface as well as a wireless interface such as an IEEE 802.11 WiFi interface. Data may also be received from any one of a variety of different wireless communications networks and in accordance with any one of several different protocols. These include: a cellular (or mobile phone) network (e.g. a Global System for Mobile communications, GSM, network), including current 2G, 3G, 4G, 5G, and LTE networks; and an IEEE 802.11 network (WiFi or Wireless Local Area Network, WLAN).

Referring back to FIG. 1, in one embodiment, communication devices 120*a-c* may communicate with the server 150 over network 140 using the communication interfaces 330.

Network 140 can be a cellular or mobile network, such as GSM, General Packet Radio Services (GPRS), code-division multiple access (CDMA) one (or cdmaOne), CDMA2000, Evolution Data Optimized (EV-DO), Enhanced Data rates for GSM Evolution (EDGE), Universal Mobile Telecommunications System (UMTS), including 2G, 3G, 4G, 5G, LTE networks and their associated call and data protocols, and/or an IEEE 802.11 data network, such as WiFi, wired (e.g., Ethernet connection) or wireless local area network (LAN). Server 150 may be any kind of servers or a cluster of servers, such as Web or cloud servers, application servers, backend servers, or a combination thereof. Server 150 may be data analytics servers, content servers, traffic information servers, map and point of interest (MPOI) severs, or location servers, etc.

With continued reference to FIG. 1, user 110*a* may communicate with server 150 over network 140 using communication device 120*a*. In one embodiment, communication device 120*a* may sample ambient sound (also referred to as ambient audio) from an acoustic environment, for example, using an audio capturing device (e.g., a microphone). Communication device 120*a* may analyze the ambient sound (or audio) sample to ensure that the sound sample have desired (or useful) information. For instance, in some embodiments, the sound sample may include only unwanted components (e.g., background noise). Transmitting a constant stream of unwanted components would occupy a significant amount of bandwidth, thereby introducing unnecessary complexity in system 100 to process the ambient sound. Once the communication device 120*a* determines that there is desired information in the ambient sound sample, it may record (or save) some or all portions of the ambient sound sample.

In one embodiment, the recorded ambient sound sample may be formatted for upload to server 150. In one embodiment, in addition to the recorded sound sample, communication device 120*a* may upload contextual data and one or more corresponding timestamps to server 150. Contextual data may provide a sense of historical patterns and routines for a given user (e.g., user 110*a*). For example, based on sensor data provided by sensors 340, communication device 120*a* may determine the contextual data. The sensor data, for example, may include the location and responses of user 110*a* (e.g., speeds, accelerations, decelerations, directions) captured by sensors 340 of communication device 120*a* at different points in time (or time frames). Using this information, communication device 120*a* may compute the contextual data, which may include location information, movement information (e.g., driving, walking, etc.), direction of movement, change in pace (e.g., user 110*a* starts running), and the like, as pertain to user 110*a*. In some embodiments, the timestamp(s) may include a current time at which the ambient sound is sampled, a current time at which the ambient sound sample is recorded, a current time at which the sensor data is captured, and/or a current time at which the contextual data is determined.

In one embodiment, communication device 120*a* may compress the recorded ambient sound sample, contextual data, and/or timestamp(s) prior to uploading to server 150. In one embodiment, communication device 120*a* may perform voice recognition on the ambient sound recorded to identify the source of speech recorded in the ambient sound is from user 110*a*. The source of speech, for example, may be the speech of user 110*a*. This information may also be part of the contextual data, in one embodiment.

Server 150 may receive the recorded ambient sound sample, contextual data, and timestamp(s) from communication device 120*a*, and perform an analysis on the uploaded sound sample. In analyzing in the uploaded sound sample, server 150 may connect to data store 150 (e.g., a database) to receive (or retrieve) historical ambient sound samples collected and historical analyzed sound samples to perform a comparison with the current uploaded ambient sound sample. Based on the analysis and the uploaded contextual data, server 150 may determine whether user 110*a* is in an emergency (or danger) situation. If a potential danger is detected, server 150 may send a notification (e.g., a text message, a phone call, a voicemail, a push notification, a message via a third-party application, or an email) to communication device 120*a* to alert user 110*a* of the potential danger. Based on user 110*a*'s response, server 150 may perform additional steps, such as notifying one or more emergency contacts (e.g., users 110*b-c* via communication devices 120*b-c*) and/or emergency services 170 (e.g., dialing 911). The notification sent may include information such as the detected potential danger, location information of user 110*a*, and a time at which the potential danger occurred.

The embodiments of the disclosure may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, or the like.

Figure 2:
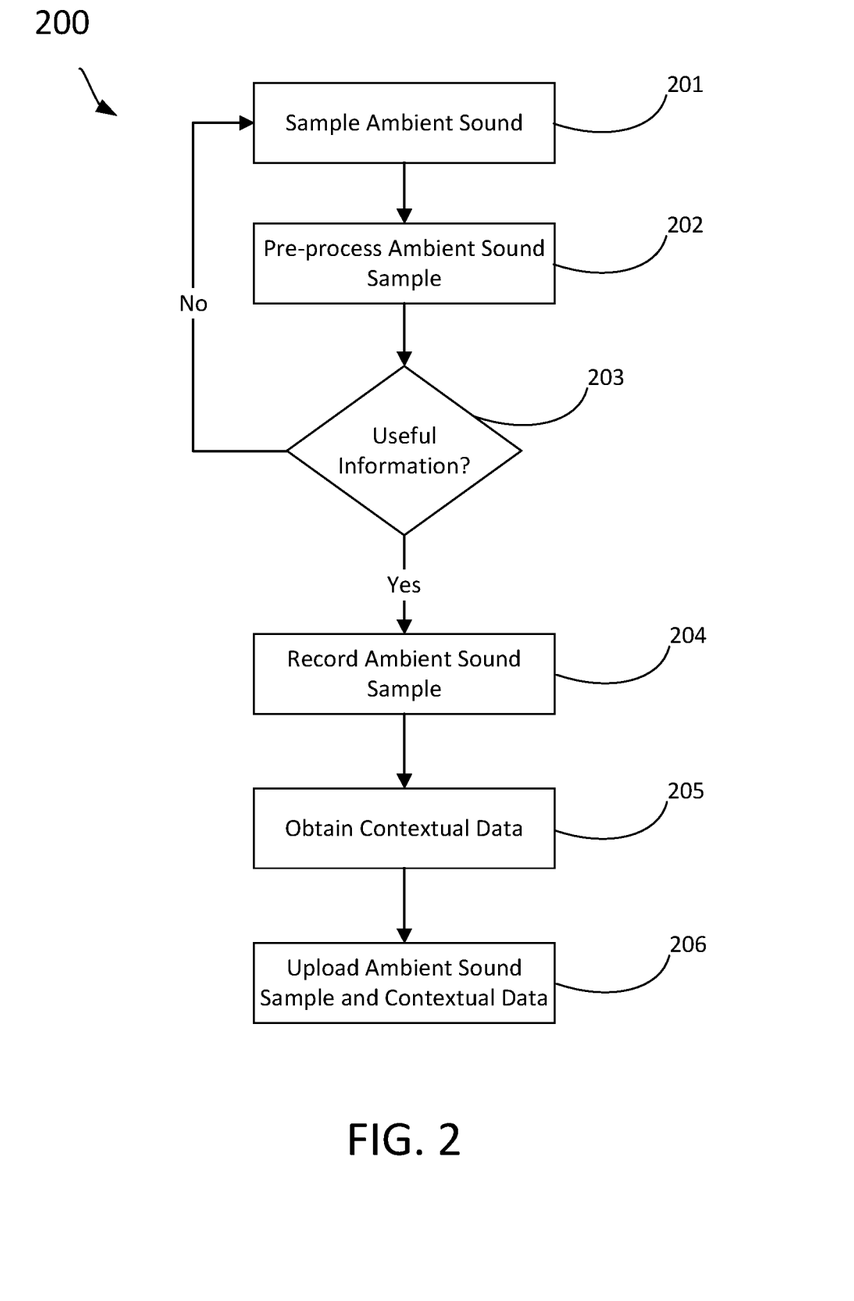
FIG. 2 is a flow diagram illustrating a process for emergency detection and alert according to one embodiment.

FIG. 2 is a flow diagram illustrating a process for emergency detection and alert according to one embodiment. Process 200 may be performed by processing logic which may include software, hardware, or a combination thereof. For example, process 200 may be performed by processor(s) 310 of communication devices 120a-c of FIG. 1.

Referring to FIG. 2, at block 201, the processing logic may sample ambient sound (or audio) within an acoustic environment. For example, using an audio capturing device (e.g., a microphone) of a communication device (e.g., communication device 120a), the ambient sound may be sampled at a sampling frequency (or sampling rate), such as within a range of 20-20,000 Hz, or as it is detected (or captured) by the audio capturing device in real-time.

Figure 6:
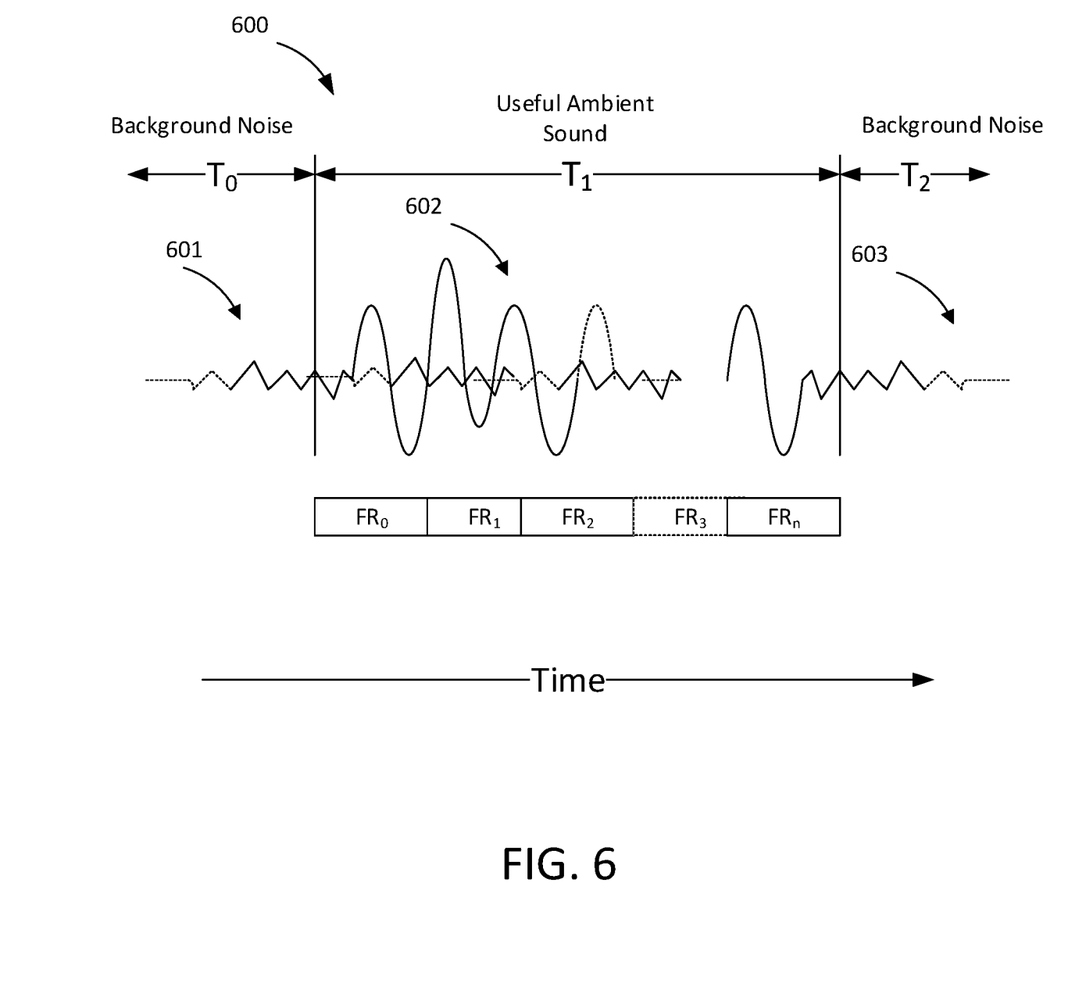
FIG. 6 illustrates a waveform that represents an ambient sound sample according to one embodiment.

At block 202, the processing logic may pre-process the ambient sound sample. For example, the ambient sound sample may be processed or analyzed to ensure there is useful (or desired) information within the ambient sound sample. More specifically, the ambient sound sample may be separated analytically into a number of components and analyzed in terms of parameters such as frequency (or pitch), amplitude, tempo, or a combination thereof to determine whether there is useful information. As an example, referring now to FIG. 6, which illustrates waveform 600 that represents ambient sound sample detected during time period $T_0$ to time period $T_2$. As shown in FIG. 6, some portions of the detected ambient sound sample is considered "useless" or unwanted, such as background noise represented by waveform portion 601 during $T_0$ (or waveform portion 603 during $T_2$), since they are monotonic. That is, the ambient sound sample is unwanted if its frequency (or pitch) remains unchanged over a time period (e.g., $T_0$ and $T_2$). Examples of unwanted ambient sound sample may include, but not limited to, humming noise of an appliance (e.g., refrigerator), traffic noise, noise in a restaurant, etc.

On the other hand, the ambient sound sample may include useful information if it has a change in frequency (or pitch) over a time period. The change in frequency (or pitch), for example, may indicate that an event is happening, such as a cry for help, a gunshot, a bark, a sharp brake (e.g., loud grinding sound), a crash (e.g., a loud and sudden noise), etc. To determine whether there is a change in frequency (or pitch), consider waveform portion 602 of FIG. 6 that represents a portion of the ambient sound sample detected during time period $T_1$. In FIG. 6, waveform portion 602 may be divided into sub-waveforms detected at different time frames (e.g., $FR_0 \ldots FR_N$) for analysis. For example, a first sub-waveform detected at $FR_1$ may be compared with a second sub-waveform detected at $FR_0$ (an immediately previous sub-waveform). If a change (or delta) in frequency (or pitch) between the first sub-waveform and the second sub-waveform satisfies (e.g., equal to or greater than) a predetermined threshold, then waveform portion 602 is determined to include useful information. Similarly, a third sub-waveform detected at FR2 can be compared with the first sub-waveform at $FR_1$ (an immediately previous sub-waveform relative to the third sub-waveform) to determine whether there is a change in frequency (or pitch), and so on. Accordingly, in FIG. 6, waveform portion 602 (and therefore waveform 600) would be determined to include useful information as the change in frequency (or pitch) between the first sub-waveform and the second sub-waveform would satisfy the predetermined threshold.

Alternatively or additionally, in one embodiment the amplitude of waveform 600 (e.g., clarity of ambient sound sample) is considered in determining whether the sampled ambient sound includes useful information. For example, if amplitude of waveform 600 (i.e., clarity) does not satisfy (e.g., less than) a predetermined amplitude threshold, then waveform 600 is determined not to include useful information since it cannot be ascertained what event is happening (if any) based on such low clarity. On the other hand, if the amplitude satisfies (e.g., equal to or greater than) the predetermined amplitude threshold, then waveform 600 is determined to include useful information since the clarity is sufficient to ascertain the event that is happening.

Referring back to FIG. 2, at block 203, the processing logic determines whether there is useful information (e.g., components) within the ambient sound sample. If there is useful information, the processing logic proceeds to block 204. Otherwise, the processing logic returns to block 201 to re-sample ambient sound.

At block 204, the processing logic may record the ambient sound sample. For instance, the processing logic may save the ambient sound sample (which may be in digital form) on memory 320 of the communication device (e.g., any one of communication devices 120a-c).

At block 205, the processing logic may obtain contextual data. As previously described, sensor data may be provided by sensors 340 of a communication device (e.g., communication devices 120a-c). The processing logic may utilize such sensor data to compute (or determine) the contextual data of a user (e.g., users 110a-c). Sensor data, for example, may include location and responses of the user, such as speeds, accelerations, decelerations, and directions. Using this information, the processing logic may compute location information, movement information (e.g., driving, walking, etc.), direction of movement, change in pace (e.g., the user starts running), and the like, as pertain to the user. In one embodiment, the processing logic may perform voice (or speech) recognition to identify the source of speech in the ambient sound sample. The source of speech, for example, may be used to determine whether the speech came from the user. This information may also be included as part of the contextual data.

At block 206, the processing logic may upload (or send) the ambient sound sample and contextual data, for example, to server 150 of FIG. 1. In some embodiments, in addition to the sampled ambient sound sample and contextual data, the processing logic may upload one or more timestamps to server 150. In some embodiments, the processing logic may store the timestamp(s) on memory 320, where the timestamp(s) may include a current time at which the ambient sound was sampled, a current time at which the ambient sound was recorded, a current time at which the sensor data was captured, and/or a current time at which the contextual data was computed. In one embodiment, prior to uploading the ambient sound sample, contextual data, and/or timestamp(s), the processing logic may generate a profile of soundscape for different locations and times based on the ambient sound sample and contextual data. Patterns and routines in the profile may then be compared with historical patterns and routines of the user. If significant deviations (e.g., exceeding one or more predetermined thresholds) are identified from the comparison, such as the user visits a high crime area where he/she normally does not visit, the deviations may be highlighted as potential areas of further investigation (or danger). Accordingly, contextual data and ambient sound sample from such deviations may be uploaded to server 150 for further assessment.

In one embodiment, prior to uploading the above-mentioned data, the processing logic may format the ambient sound sample in accordance with an audio data format, such as waveform audio file format (WAV), audio interchange file format (AIFF), Au file format (AU), pulse-code modulation (PCM), Windows media audio (WMA), MP3, etc. In one embodiment, prior to uploading the data, the processing logic may also compress the data using a compression technique (or method) to save transmission bandwidth. Although not shown in FIG. 2, in one embodiment, "handshaking" may be invoked between the communication device and server 150 to ensure successful upload of the data.

Figure 4:
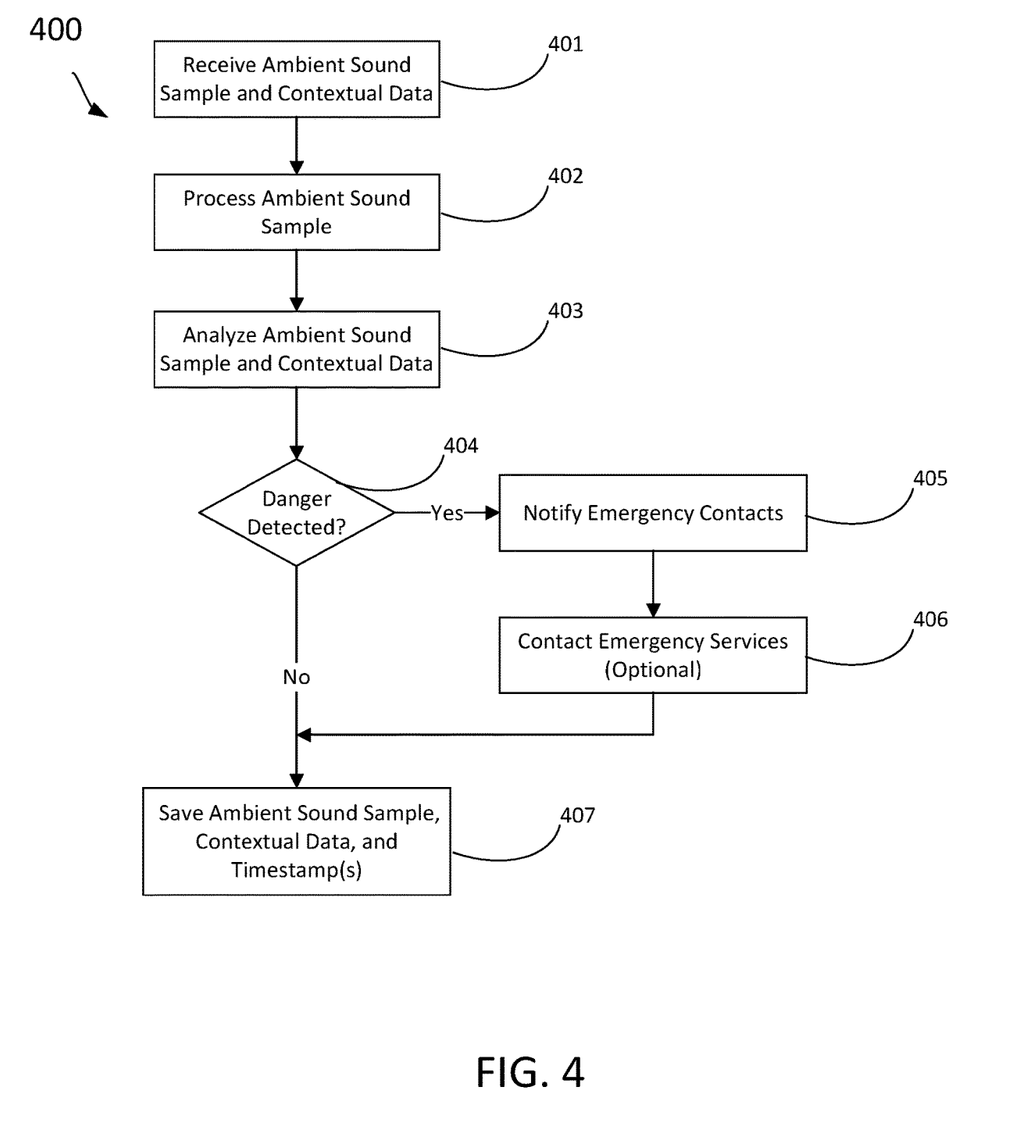
FIG. 4 is a flow diagram illustrating another process for emergency detection and alert according to one embodiment.

FIG. 4 is a flow diagram illustrating another process for emergency detection and alert according to one embodiment. Process 400 may be performed by processing logic which may include software, hardware, or a combination thereof. For example, process 400 may be performed by server 150 of FIG. 1.

Referring to FIG. 4, at block 401, the processing logic receives the ambient sound sample and contextual data, for example, from a communication device, such as communication devices 120a-c. As previously described, the received ambient sound sample and contextual data may be associated with the deviations in a comparison between the patterns and routines in a profile of soundscape and the historical patterns and routines of a particular user (e.g., user 110a), although the received ambient sound sample and contextual data may be the entire sound sample and contextual data recorded and collected, respectively, over a time period. In one embodiment, the processing logic may also receive one or more timestamps from the communication device, where the timestamp(s) may include a current time at which the ambient sound was sampled, a current time at which the ambient sound was recorded, a current time at which the sensor data was captured, and/or a current time at which the contextual data was computed. In one embodiment, the received ambient sound sample, contextual data, and timestamp(s) may be compressed. In this case, the processing logic may decompress the data using a decompression technique (or method) prior to processing the data.

At block 402, the processing logic processes the ambient sound sample. In one embodiment, the received ambient sound sample may be formatted in accordance with an audio format (e.g., WAV, AIFF, AU, PCM, WMA, MP3, etc.). As such, the processing logic may process the ambient sound sample in accordance with such audio format. In one embodiment, to process the ambient sound sample, the processing logic may perform digital signal processing (DSP) on the sound sample, such as filtering (or isolating) unwanted portion(s) of the sound sample (e.g., background noise or unwanted constant tones or patterns). In one embodiment, the processing logic may enhance the audio clarify of the ambient sound sample, for example, by amplifying the sound sample.

At block 403, the processing logic may analyze the ambient sound sample and contextual data. For example, the processing logic may perform a speech (or voice) recognition technique to identify the sounds produced in human speech, for example by the user. The identified sounds, for example, may include, but is not limited to, the user's cry for help, a scream, a high-pitched voice, a shriek, etc. In one embodiment, the processing logic may also perform a sound recognition technique to identify sounds that are associated with distress events. The identified sounds, for example, may include, but not limited to, a gunshot, a bark, footsteps, a smacking sound, slam car door sound, etc.

In some embodiments, in analyzing the received ambient sound sample, the processing logic may connect to a data store (e.g., data store 151 of FIG. 1) to obtain (e.g., receive or retrieve) historical audio and context profiles. The audio and context profiles may include a collection of previous ambient sound samples from all users (e.g., users 110a-c) over a time period. The previous ambient sound samples may include analyzed sound samples that have been identified and categorized (or labelled) into different sound categories or labels (e.g., danger, safe, or the like). Each sound sample, for example, may include a distinctive pattern, such as frequency and/or amplitude pattern (or waveform). Accordingly, the received ambient sound sample may be compared with the previous analyzed sound samples to identify deviations (if any). That is, the received ambient sound sample may be compared with the analyzed sound samples to determine a change (or delta) in frequency (or pitch).

Similarly, the audio and context profiles may also include previously collected contextual data from all users over a time period. The previously collected contextual data may be identified and categorized (or labelled) into different contextual environments surrounding the users (e.g., location, movement, direction, etc.). For example, the contextual data may indicate that a user is in a location with low crime rate or a location with high crime rate.

At block 404, the processing logic determines whether a danger (or emergency situation) is detected based on the received ambient sound sample and contextual data. For example, the received contextual data may be compared with previously collected contextual data to determine a contextual environment surrounding a user (e.g., dangerous or safe location, unusual activities such as sudden running, rapid acceleration or deceleration, etc.). The received ambient sound sample may also be compared with previous ambient sound samples to determine a sound category for the received ambient sound sample (e.g., sound associated with a dangerous or safe situation). As an example, a sound sample associated with a dangerous situation (e.g., a gunshot sound) would include a distinctive pitch (or frequency pattern). Therefore, if the waveform of the received sound sample is similar to that of a previous analyzed sound sample that has been identified as "danger" (i.e., associated with a dangerous situation), then the received sound sample may be identified as "danger". Otherwise, the received sound sample may be identified as "safe" (i.e., associated with a safe situation).

Based on the comparisons, the processing logic may determine whether there is a danger. As an example, if a user is in a location that is normally quiet at 8:00 PM (e.g., a neighborhood) and a loud sound is detected with a rapid change in pitch that significantly deviates from the normal pattern (i.e., the loud sound has been identified as "danger"), then it may be determined that a danger is detected. Otherwise, it may be determined that a danger is not detected.

Examples of existence of a potential danger may include, but not limited to, a high-pitched scream of help from the user, a bark (or snarl) along with contextual data indicating a sudden running by the user (which may indicate that the user is being attacked by a dog), sound of a loud crash coupled with contextual data indicating a rapid deceleration (which may indicate an accident), a metallic sound followed by sound of glass breaking coupled with contextual data (e.g., location information) indicating that the user is at home (which may indicate a break-in), sound of a thwack (which may indicate that the user is being physically attacked), threatening phrases, etc. If it is determined that a danger is detected, the processing logic proceeds to block 405. Otherwise, the processing logic proceeds to block 407.

At block 405, the processing logic may notify one or more emergency contacts (e.g., users 110*b-c* of FIG. 1) that are previously provided by the user (e.g., user 110*a* of FIG. 1). In one embodiment, the emergency contact(s) may be assigned by the user during initial setup (or installation) of an application (also referred to as "app") on the communication device (e.g., device 120*a*) equipped with the user. In one embodiment, the emergency contact(s) may be notified via a push notification, a short service message (SMS) message, a phone call, and/or an email. Although not shown in FIG. 4, in one embodiment, prior to notifying the emergency contact(s) the processing logic may alert the user (e.g. user 110*a*) of the potential danger and request feedback (e.g., cancellation or confirmation) from the user. To alert the user, the processing logic may send a command to play a pre-selected sound on the communication device of the user (e.g., communication device 120*a* of FIG. 1), send a command to play a continuous beeping sound on the communication device, send a push notification, SMS message, and/or email to the user, call the user, etc. If the user's feedback indicates a cancellation of the alert, the processing logic may proceed to block 407. Otherwise if the user's feedback indicates a confirmation of the alert or no feedback is received within a predetermined time limit, the processing logic may notify the emergency contact(s).

At block 406, in one embodiment, based on the nature of the potential danger detected (e.g., gunshot, accident, etc.), the processing logic may optionally contact emergency services (e.g., dialing 911) to notify the potential danger depending on the location information of the user (i.e., location of the user's communication device). In contacting the emergency services, the processing logic may provide details about the detected potential danger, such as location, time, etc.

At block 407, the processing logic saves the received (or uploaded) ambient sound sample, contextual data, and timestamp(s) in the data store (e.g., data store 151) for subsequent analysis. In one embodiment, the data store (e.g., database) is built through machine learning and data science. For example, by asking users for feedback, various deviations may be tagged as being dangerous or safe. In one embodiment, the processing logic may send a request (or message) to the user's communication device (e.g., communication device 120*a*) to erase the recorded ambient sound sample stored on memory 320.

Figure 5:
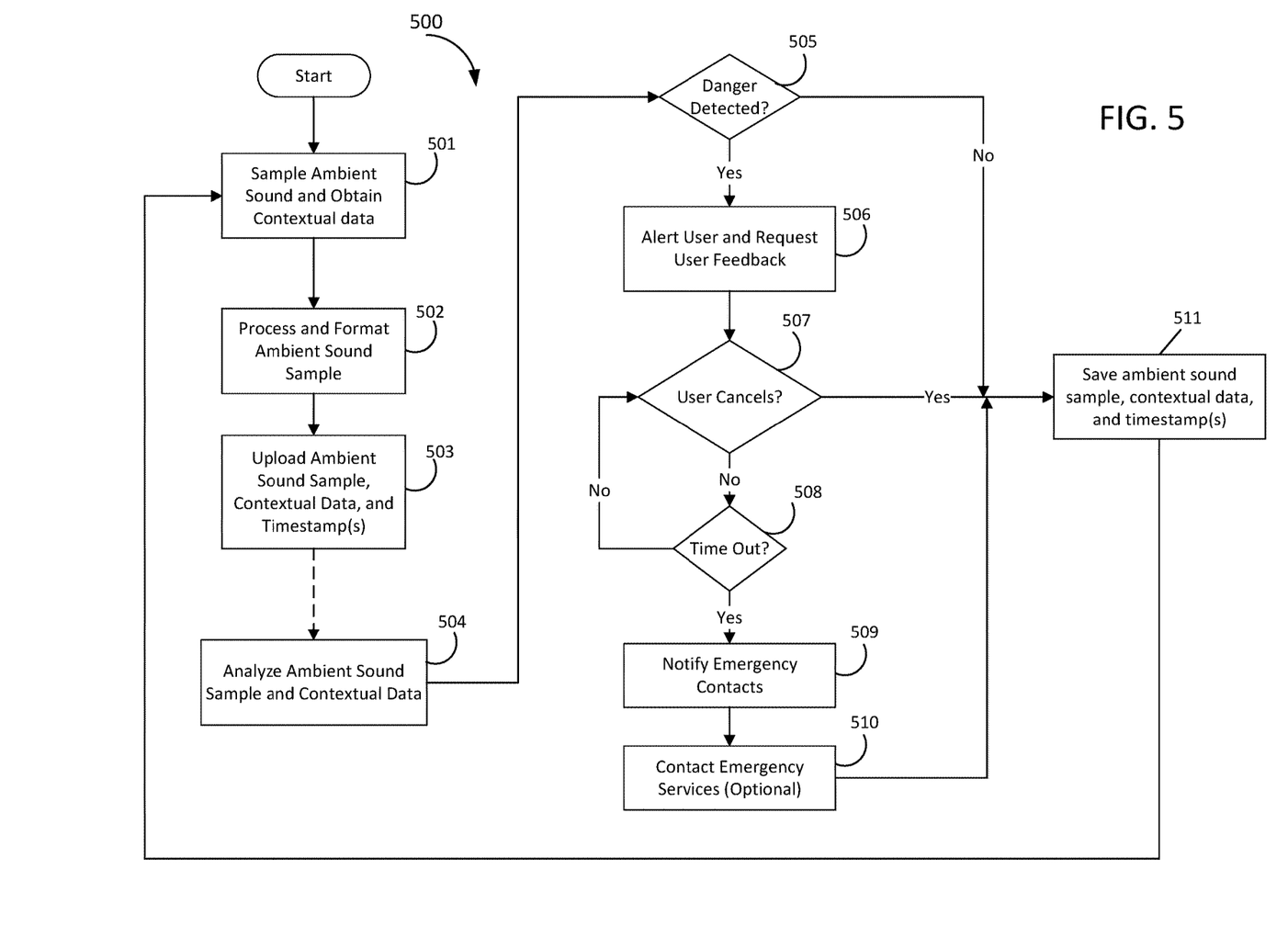
FIG. 5 is a flow diagram illustrating yet another process for emergency detection and alert according to one embodiment.

FIG. 5 is a flow diagram illustrating yet another process for emergency detection and alert according to one embodiment. Process 500 may be performed by processing logic which may include software, hardware, or a combination thereof. For example, process 500 may be performed by any of communication devices 120*a-c* of FIG. 1, server 150 of FIG. 1, or a combination thereof.

Referring to FIG. 5, at block 501, the processing logic may sample ambient sound and obtain contextual data. For example, using an audio capturing device (e.g., a microphone) of communication device 120*a*, communication device 120*a* may sample ambient sound from an acoustic environment. As previously described, the ambient sound may be sampled at a sampling frequency (or sampling rate), such as within a range of 20-20,000 Hz, or as it is detected (or captured) by the audio capturing device in real-time. In one embodiment, sensor data from sensors 340 of communication device 120*a* may be utilized to determine the contextual data. Sensor data, for example, may include location and responses of the user, such as speeds, accelerations, decelerations, and directions. Using this information, communication device 120*a* may determine the contextual data that includes location information, movement information (e.g., driving, walking, etc.), direction of movement, change in pace (e.g., the user starts running), and the like, as pertain to user 110*a*.

At block 502, the processing logic may process and format the ambient sound sample. In one embodiment, communication device 120*a* may analyze the ambient sound sample to ensure that the sound sample include useful information. This, for example, has been previously described with respect to FIG. 2, and for brevity sake, will not be described again. If there is useful information within the sound sample, communication device 120*a* may record (or save) the sound sample, for example, on memory 320. In one embodiment, the recorded sound sample, contextual data, and/or timestamp(s) may be formatted, for example in accordance with a network protocol such as transmission control protocol/internet protocol (TCP/IP), for upload to server 150 over network 140. In one embodiment, the recorded sound sample may be formatted in accordance with an audio format, such as WAV, AIFF, AU, PCM, WMA, MP3, or the like. In one embodiment, the timestamp(s) may include a current time at which the ambient sound is sampled, a current time at which the ambient sound sample is recorded, a current time at which the sensor data is captured, and/or a current time at which the contextual data is determined. In some embodiments, communication device 120*a* may compress the recorded sound sample, contextual data, and/or timestamp(s) prior to uploading to server 150 to save transmission bandwidth. In one embodiment, communication device 120*a* may perform a voice recognition technique (or method) to identify the source of speech recorded in the ambient sound sample, which may be the speech of user 110*a*. This information (i.e., the source of speech) may also be communicated to server 150, separately or as part of the contextual data.

At block 503, the processing logic may upload the ambient sound sample, contextual data, and timestamp(s) to server 150. To do so, such information may be transmitted to server 150 over network 140.

At block 504, the processing logic may analyze the ambient sound sample and contextual data. For example, upon receiving the ambient sound sample, contextual data and timestamp(s) from communication device 120*a*, the server 150 may decompress the data, if the data was previously compressed for example by communication device 120*a*, for analysis. The server 150 may then analyze the received ambient sound sample and contextual data, which is previously described with respect to block 403 of FIG. 4, and for brevity sake, will not be described again.

At block 505, the processing logic may determine whether a potential danger is detected. This is also previously described with respect to block 404 of FIG. 4, and again for brevity sake, will not be described again. If a potential danger is detected, the processing logic proceeds to block 506. Otherwise, the processing logic proceeds to block 511.

At block 506, the processing logic may alert user 110*a* and request feedback or response (e.g., cancellation or confirmation of the alert) from user 110*a*. The alert, for example, may include, but not limited to, playing a pre-selected sound on the communication device 120*a* of user 110*a*, playing a continuous beeping sound on the communication device 120*a*, sending a push notification, SMS message, and/or email to the user, calling the user 110*a*, etc.

At block 507, the processing logic may determine whether the alert has been cancelled by user 110a. For example, using an input device of communication device 120a, the user 110a may cancel or confirm the alert. The input device, for example, may be a touch pad, a touch sensitive screen (which may be integrated with display device of communication device 120a), a pointer device such as a stylus, or a keyboard (e.g., physical keyboard or a virtual keyboard displayed as part of a touch sensitive screen). If user 110a elects to cancel the alert, server 150 would receive a feedback signal carrying a response indicating the cancellation from communication device 120a. In this case, the processing logic proceeds to block 511. Otherwise, the processing logic proceeds to block 508. In one embodiment, the response from the feedback signal may instead indicate a confirmation of the alert. In this case, the processing logic may proceed to block 509 (instead of block 508) to immediately notify the emergency contact(s), as described in more detail herein below.

At block 508, the processing logic may wait until a predetermined time limit expires (or times out). If the predetermined time limit expires, the processing logic proceeds to block 509. Otherwise, the processing logic loops back to block 507 to determine whether the alert has been cancelled by user 110a.

At block 509, the processing logic may notify one or more emergency contacts (e.g., users 110b-c) that are previously provided by the user 110a. For example, the emergency contact(s) may be assigned by user 110a during initial setup (or installation) of an application on the communication device 120a equipped with the user 110a. In assigning (or adding) the emergency contact(s), user 110a may provide information of the emergency contact(s), such as name, address, phone number, and/or email. The information of the emergency contact(s) may be stored on memory 320 of communication device 120a, or be uploaded and stored on the server 150. In one embodiment, the emergency contact(s) may be notified by server 150 via a push notification, an SMS message, a phone call, and/or an email.

At block 510, the processing logic may optionally contact emergency services (e.g., dialing 911) to notify the potential danger based on the nature of the potential danger detected (e.g., gunshot, accident, etc.), and depending on the location information of the user 110a (i.e., location of the communication device 120a). In contacting the emergency services, the processing logic may provide details about the detected potential danger, such as location, time, etc.

At block 511, the processing logic may save the analyzed (or uploaded) ambient sound sample, contextual data, and timestamp(s) in data store 151 to serve as historical data for subsequent analysis. In one embodiment, data store 151 is built using basic characteristics, but primary through machine learning and data science. For example, by asking users for feedback, the ambient sound sample and contextual data (and various deviations from the above-discussed comparisons) may be tagged as dangerous or safe for subsequent comparisons. Accordingly, upon prompting a user whether they are in danger (as previously described with respect to block 506) and the user responds that they are not (e.g., by cancelling the alert), such response may be added as a labeled data point to a dataset. The labelling allows the dataset to be built and train machine learning models/algorithms (e.g., deep learning architectures such as deep neural networks, convolutional neural networks, deep belief networks and/or recurrent neural networks). In one embodiment, the server 150 may send a request (or message) to the communication device 120a to erase the recorded ambient sound sample stored on memory 320 of communication device 120a.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
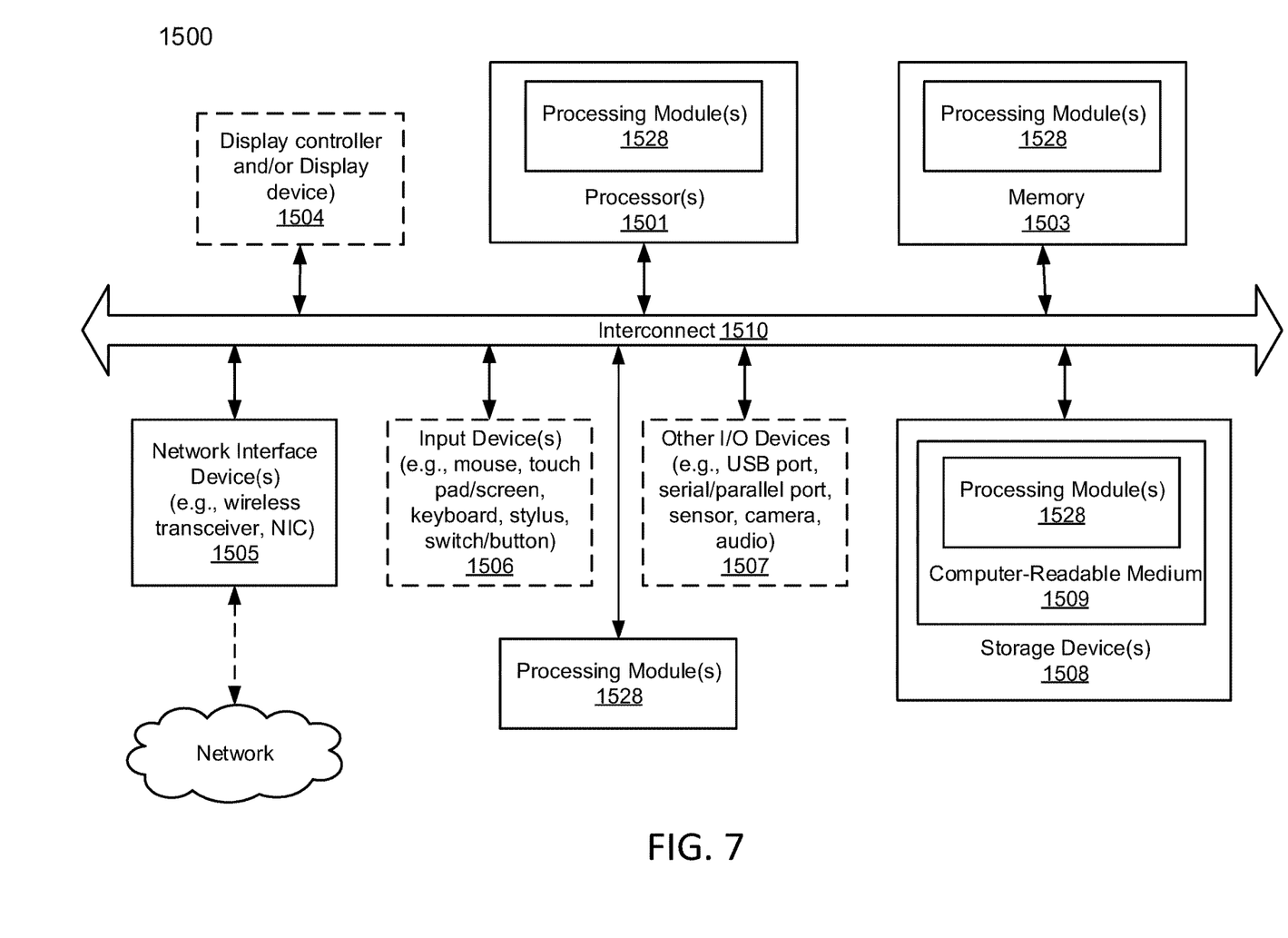
FIG. 7 is a block diagram illustrating an example of a data processing system which may be used with one embodiment.

FIG. 7 is a block diagram illustrating an example of a data processing system which may be used with one embodiment of the disclosure. For example, system 1500 may represent any of data processing systems described above performing any of the processes or methods described above, such as, for example, server 150 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, components performed by a tracking server or an MCD. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for detection of a potential danger for an individual user, comprising:
   receiving an ambient sound sample and contextual environmental data surrounding the individual user from a communication device of the individual user;
   analyzing the ambient sound sample and the contextual environmental data to identify an indication of potential danger to the individual user, wherein the indication of potential danger to the individual user is identified by comparing the ambient sound sample with historical audio profiles from the communication device of the individual user to determine a change in frequency or change in pitch that indicates a potential danger to the individual user, and comparing the contextual environmental data surrounding the individual user with stored contextual environmental profiles to further determine there exists the potential danger at a location of the individual user; and
   in response to the identified indication of potential danger to the individual user, alerting the individual user of the communication device of the potential danger and requesting a response from the individual user.

2. The method of claim 1, further comprising:
   determining whether the response was received from the individual user;
   in response to determining that no response was received from the individual user within a predetermined time limit, or that the response was received from the individual user indicating a confirmation of the potential danger,
      notifying one or more emergency contacts assigned by the individual user of the potential danger,
      further notifying an emergency service of the potential danger with the location of the individual user, and
      storing the analyzed ambient sound sample and the contextual environmental data as historical data.

3. The method of claim 2, further comprising:
   subsequent to notifying the emergency contact(s) assigned by the user of the potential danger, contacting an emergency service to provide details about the potential danger.

4. The method of claim 2, wherein notifying the emergency contact(s) assigned by the user of the potential danger comprises:
   sending a push notification to one or more communication devices associated with the emergency contact(s),
   sending a short service message (SMS) message or an email to each of the emergency contact(s), or
   calling each of the emergency contact(s).

5. The method of claim 1, wherein analyzing the ambient sound sample and the contextual environmental data further comprises:
   performing a speech recognition technique on the ambient sound sample to identify sounds produced in human speech, and
   performing a sound recognition technique on the ambient sound sample to identify sounds that are associated with distress events.

6. The method of claim 1, wherein:
   comparing the ambient sound sample with historical audio profiles from the communication device of the individual user comprises comparing the ambient sound sample with historical ambient sound samples to identify a sound category for the ambient sound sample, wherein the historical ambient sound samples include previous analyzed sound samples that have been identified and categorized into different sound categories, and comparing the contextual environmental data surrounding the individual user with stored contextual environmental profiles comprises comparing the contextual environmental data with historical contextual environmental data to identify a contextual environment surrounding the user, wherein the historical contextual environmental data includes previous analyzed contextual environmental data that have been identified and categorized into different contextual environments.

7. The method of claim 1, wherein the contextual environmental data is computed based on sensor data provided by one or more sensors of the communication device.

8. The method of claim 7, wherein the contextual environmental data includes the user's location information, movement information, direction of movement, or change in pace.

9. The method of claim 1, wherein the ambient sound sample is obtained by sampling ambient sound using an audio capturing device of the communication device.

10. The method of claim 1, wherein alerting the user of the communication device of the potential danger comprises:
sending a command to play a pre-selected sound on the communication device,
sending a command to play a continuous beeping sound on the communication device,
sending a push notification to the communication device,
sending a short message service (SMS) message or an email to the user, or calling the user.

11. A non-transitory machine-readable medium having instructions stored therein, which when executed by a processor, cause the processor to perform operations, the operations comprising:
receiving an ambient sound sample and contextual data surrounding a user from a communication device of the user;
comparing the received ambient sound sample with historical audio profiles to determine whether there exists a change in frequency or change in pitch that deviates from a normal pattern, and comparing the received contextual data surrounding the user with historical context profiles to determine whether the user is in a dangerous location;
determining whether a potential danger exists to the user based on the comparisons; and
in response to determining that the potential danger exists to the user, alerting the user of the potential danger and requesting a response from the user.

12. The non-transitory machine-readable medium of claim 11, wherein the operations further comprise:
determining whether the response was received from the user;
in response to determining that no response was received from the user within a predetermined time limit, or that the response was received from the user indicating a confirmation of the alert,
notifying one or more emergency contacts assigned by the user of the potential danger, and
storing the analyzed ambient sound sample and the contextual data as historical data.

13. The non-transitory machine-readable medium of claim 12, wherein the operations further comprise:
subsequent to notifying the emergency contact(s) assigned by the user of the potential danger, contacting an emergency service to provide details about the potential danger.

14. The non-transitory machine-readable medium of claim 11, wherein analyzing the ambient sound sample and the contextual data further comprises:
performing a speech recognition technique on the ambient sound sample to identify sounds produced in human speech, and
performing a sound recognition technique on the ambient sound sample to identify sounds that are associated with distress events.

15. The non-transitory machine-readable medium of claim 11, wherein:
comparing the received ambient sound sample with historical audio profiles comprises comparing the ambient sound sample with historical ambient sound samples to identify a sound category for the ambient sound sample, wherein the historical ambient sound samples include previous analyzed sound samples that have been identified and categorized into different sound categories, and
comparing the received contextual data surrounding the user with historical context profiles comprises comparing the contextual data with historical contextual data to identify a contextual environment surrounding the user, wherein the historical context data includes previous analyzed contextual data that have been identified and categorized into different contextual environments.

16. The non-transitory machine-readable medium of claim 11, wherein the contextual data is computed based on sensor data provided by one or more sensors of the communication device.

17. The non-transitory machine-readable medium of claim 16, wherein the contextual data includes the user's location information, movement information, direction of movement, or change in pace.

18. The non-transitory machine-readable medium of claim 11, wherein the ambient sound sample is obtained by sampling ambient sound using an audio capturing device of the communication device.

19. A data processing system, comprising:
a processor; and
a memory coupled to the processor to store instructions, which when executed by the processor, cause the processor to perform operations, the operations including
receiving an ambient sound sample and contextual data surrounding a user from a communication device of the user;
comparing the received ambient sound sample with historical audio profiles to determine whether there exists a change in frequency or change in pitch that deviates from a normal pattern, and comparing the received contextual data surrounding the user with historical context profiles to determine whether the user is in a dangerous location;
determining whether a potential danger exists to the user based on the comparisons; and
in response to determining that the potential danger exists to the user, alerting the user of the potential danger and requesting a response from the user.

20. The data processing system of claim 19, wherein the operations further include determining whether the response was received from the user;

in response to determining that no response was received from the user within a predetermined time limit, or that the response was received from the user indicating a confirmation of the alert, notifying one or more emergency contacts assigned by the user of the potential danger, and storing the analyzed ambient sound sample and the contextual data as historical data.

* * * * *